United States Patent
Nakano

(10) Patent No.: US 6,438,090 B1
(45) Date of Patent: Aug. 20, 2002

(54) OPTICAL PICKUP DEVICE

(75) Inventor: Junichi Nakano, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/443,878

(22) Filed: Nov. 19, 1999

(30) Foreign Application Priority Data

Nov. 30, 1998 (JP) .......................... 10-339330

(51) Int. Cl.[7] ................................. G11B 7/00
(52) U.S. Cl. ................. 369/112.24; 369/94; 369/119
(58) Field of Search .......................... 369/94, 112.01, 369/112.22, 112.23, 112.24, 44.23, 119

(56) References Cited

U.S. PATENT DOCUMENTS 6,278,551 B1 * 8/2001 Matsuo .................... 369/44.14

FOREIGN PATENT DOCUMENTS

| JP | 2-206037 | 8/1990 |
|---|---|---|
| JP | 5-73944 | 3/1993 |
| JP | 6-76325 | 3/1994 |
| JP | 9-223327 | 8/1997 |

* cited by examiner

Primary Examiner—Nabil Hindi
(74) Attorney, Agent, or Firm—Frishauf, Holtz, Goodman & Chick, P.C.

(57) ABSTRACT

An optical pickup device, which records/reproduces information on/from at least one optical medium having a plurality of recording surfaces or a plurality of optical media each having at least one recording surface, comprises a light source for emitting a beam of light, a plurality of optical heads for focusing the beam on a plurality of different recording surfaces, an optical path switching device, positioned between the light source and the optical heads, for changing an optical path for guiding the beam alternatively to one of the optical heads, a first relay lens, positioned between the light source and the optical path switching device, for changing the beam into a convergent beam, second relay lenses, positioned individually between the optical path switching device and the optical heads, for changing a divergent beam, obtained after the convergent beam from the first relay lens is temporarily converged, back into a parallel beam, and a lens drive unit for driving the first relay lens along the its optical axis so as to adjust the respective lengths of optical paths between the first relay lens and the second relay lenses.

16 Claims, 3 Drawing Sheets

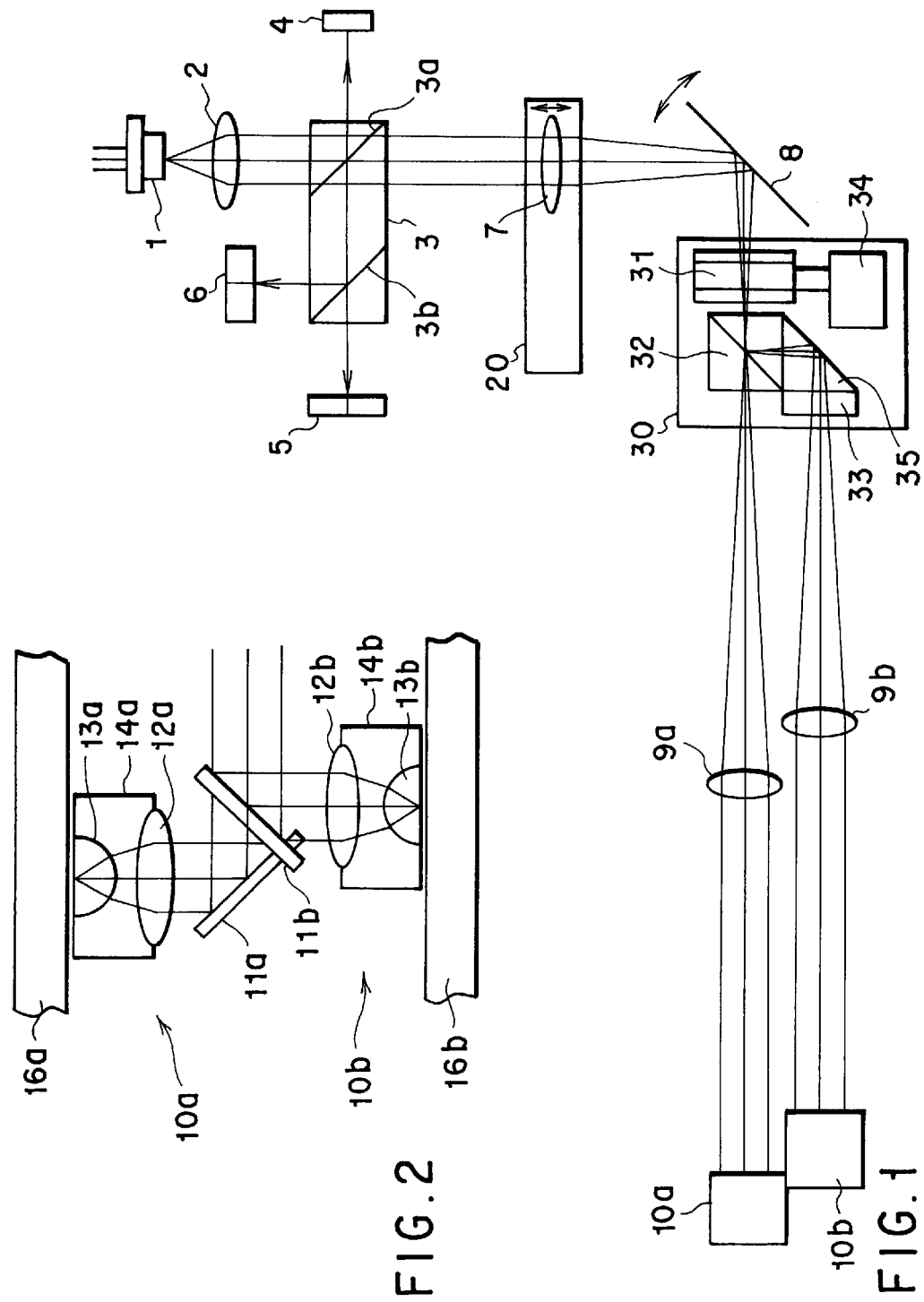

OPTICAL PICKUP DEVICE

BACKGROUND OF THE INVENTION

The present invention relates to an optical pickup device for optically recording/reproducing information on/from an optical medium, and more particularly, to an optical pickup device including a relay optical system.

Modern optical disc drives for use as external recording apparatuses for computers are expected to have an increased storage capacity and ensure higher-speed operation.

There are some approaches for increasing the storage capacity of a disc drive. The storage capacity can be increased relatively easily by making a disc for storage multi-sided. In a conventional optical disc such as a compact disc or 3.5-inch magneto-optical disc, only one side of the optical disc serves for recording/reproduction. The storage capacity of the optical disc drive can be increased if both sides of the optical disc are designed for recording/reproduction or if two or more optical discs are simultaneously loaded so that more recording surfaces can be used for recording/reproduction.

In this case, however, very high costs are entailed if an optical pickup device is mounted for each recording surface. The costs can be effectively reduced in a manner such that the optical path is changed to select one of recording surfaces for recording/reproduction so that as many components as possible can be shared among the recording surfaces. An optical disc drive of this type is disclosed in, for example, Jpn. Pat. Appln. KOKAI Publication No. 2-206037, which is incorporated herein by reference.

Supposedly, the optical path can be changed by various manners. According to a technique described in, for example, Jpn. Pat. Appln. KOKAI Publication No. 9-223327, which is incorporated herein by reference, the optical path is changed by controlling the polarization plane of incident light by a liquid crystal cell and combining it with a polarization beam splitter that is located behind the cell.

For the other requirement for higher-speed operation, a manner that uses a galvano-mirror to improve the access speed is disclosed in, for example, Jpn. Pat. Appln. KOKAI Publication No. 5-73944, which is incorporated herein by reference. According to this arrangement, focus control is effected by driving a relay lens along its optical axis, which is included in a relay optical system located in the optical path. Further, tracking control and access control are carried out by the galvano-mirror which deflects the laser beam.

A combination of the aforesaid techniques is a very effective measure to realize a high-speed, large-capacity optical disc drive.

According to an optical pickup device, the smaller the diameter of a spot formed on a disc, the higher the necessary accuracy for the adjustment of its optical components is. In the case of an optical pickup device that has a relay optical system, in particular, position adjustment for lenses and other components requires high accuracy. This is a factor that complicates adjustment for the assembly of the optical pickup device and increases the assembly cost.

In the case where the optical path is changed in the optical pickup device that includes the relay optical system, moreover, it is to be desired that an element for switching the optical path should be located in the relay optical system, in consideration of reduction in the number of essential components and the degree of freedom of layout design.

However, this arrangement requires adjustment of very high accuracy between a plurality of recording surfaces. All other lenses than one that is used in common for the optical path change must be adjusted with high accuracy for the individual recording surfaces. This also is a factor that complicates the adjustment for the assembly of the optical pickup device and increases the assembly cost.

BRIEF SUMMARY OF THE INVENTION

The present invention has been contrived in consideration of these circumstances, and its object is to provide an optical pickup device having a relay optical system, which is designed so that the necessary accuracy for the position adjustment of its components is reduced, thus ensuring lower assembly cost.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view of an optical pickup device according to an embodiment of the present invention;

FIG. 2 is a side view of optical heads shown in FIG. 1;

DETAILED DESCRIPTION OF THE INVENTION

Figure 3:
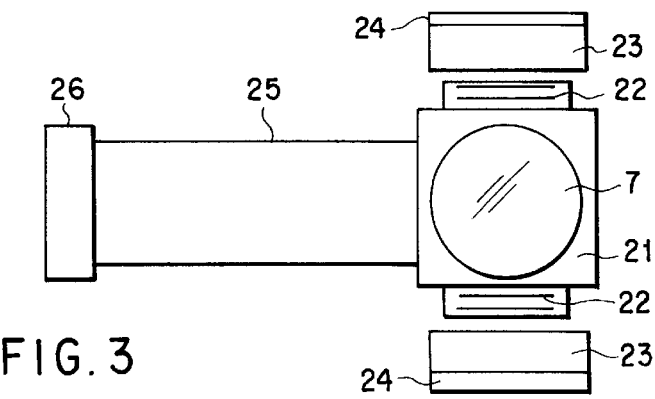
FIG. 3 is an enlarged view of a lens actuator shown in FIG. 1.

An optical pickup device according to an embodiment of the present invention will now be described with reference to the accompanying drawings. The optical pickup device according to the present embodiment is a device for recording/reproducing information on/from at least one optical medium having a plurality of recording surfaces or a plurality of optical media each having at least one recording surface by switching an optical path. More specifically, it is an optical pickup device in which the optical path is switched so that information can be alternatively recorded on or reproduced from one recording surface of each of two optical discs.

As shown in FIG. 1, the optical pickup device comprises a semiconductor laser 1 as a light source for emitting a beam of light for information recording/reproduction, a collimating lens 2 for changing the laser beam from the laser 1 into a parallel beam, a galvano-mirror 8 for deflecting the laser beam to effect tracking control, an optical path switch 30 as an optical path switching device for alternatively changing the optical path of the laser beam, and a pair of optical heads 10a and 10b. As used herein, the term "optical head" refers a functional unit for finally focusing light on a recording surface.

The optical pickup device further comprises a first relay lens 7 for changing the parallel laser beam from the collimating lens 2 into a convergent beam and second relay lenses 9a and 9b located between the optical path switch 30 and the optical heads 10a and 10b, respectively. The lenses 9a and 9b change the divergent beam back into the parallel beam after the convergent beam from the first lens 7 is converged once. Moreover, the optical pickup device includes a lens actuator 20 as a lens drive unit for driving the first relay lens 7 along its optical axis, so as to adjust the respective lengths of optical paths between the first relay lens 7 and the second relay lenses 9a and 9b.

For signal detection, furthermore, the optical pickup device includes a prism 3, located between the collimating lens 2 and the first relay lens 7, for partially reflecting the laser beam from the collimating lens 2 and separating going and returning laser beams, a monitoring photodiode 4 for detecting the intensity of the laser beam emitted from the semiconductor laser 1, an information detecting photodiode 5 for detecting information signals, and servo photodiode 6 for detecting servo signals.

As shown in FIG. 2, the optical heads 10a and 10b include mirrors 11a and 11b for bending the laser beam toward optical discs 16a and 16b and objective lenses (pre-focusing lenses) 12a and 12b for focusing the laser beam on the discs 16a and 16b, respectively. For near field recording/reproduction, the optical heads 10a and 10b may further include, respectively, solid immersion lenses (SILS) 13a and 13b for further concentrating the laser beam and sliders 14a and 14b for supporting the lenses 12a, 12b, 13a and 13b. The sliders 14a and 14b are lifted off the optical discs 16a and 16b, respectively, by air currents caused by rotation of the discs 16a and 16b.

As shown in FIG. 3, the lens actuator 20 includes a holding member 21 for holding the first relay lens 7, rectangular coils 22 on the holding member 21, magnets 23 facing the coils 22, yokes 24 supporting the magnets 23, a pair of plate springs 25 which support the lens 7 so as to allow it to move along its optical axis, and a stationary member 26 for supporting the springs 25.

The first relay lens 7 is fixed to the center of the holding member 21, while the coils 22 are fixed individually to the top and bottom of the member 21. The magnets 23 face their corresponding coils 22. The magnets 23 include two magnet pieces that are fixed to their corresponding yokes 24. The two magnet pieces are arranged along the direction of the optical axis so that their respective surfaces facing the coils 22 are opposite in polarity.

Each of the plate springs 25 is formed of a rectangular plate of a metal such as stainless steel or beryllium. One end of each of the springs 25 is fixed to the holding member 21 for the first relay lens 7, and the other end to the stationary member 26. The two springs 25 extend parallel to each other with a given space between them. The springs 25 support the first relay lens 7 so as to allow it to move along the optical axis. Thus, the lens 7 is moved along the optical axis as current is supplied to the coils 22. Where, the optical axis is perpendicular to the drawing sheet of FIG. 3. The plate springs 25 are located so that its long sides extend parallel to the respective recording surfaces of the optical discs. Thus, the optical pickup device can be reduced in thickness.

As shown in FIG. 1, the optical path switch 30 includes a liquid crystal cell 31 for controlling the polarization plane of light passing through it, a liquid crystal cell driving circuit 34 for driving the cell 31 by applying voltage to it, and a polarization beam splitter 32 which reflects or transmits an entering beam of light depending on the direction of the polarization plane of the light. The switch 30 further includes a reflection prism 35 having a reflective surface that deflects again the reflected beam from the splitter 32 and a half-wavelength plate 33 on the optical path of the laser beam from the prism 35. Thus, the switch 30 can change the optical path along which incident light from the galvano-mirror 8 is guided alternatively to the optical head 10a or 10b.

A divergent beam of light emitted from the semiconductor laser 1 is changed into a parallel beam by the collimating lens 2, and the parallel beam reaches the prism 3. The light beam incident upon a surface 3a of the prism 3 is partially reflected and directed to the monitoring photodiode 4. The photodiode 4 is used as a monitor for controlling the output power of the semiconductor laser 1.

After the laser beam passing through the prism 3 is changed into a convergent beam by the first relay lens 7, and then directed to the optical path switch 30 by the galvano-mirror 8.

The galvano-mirror 8 is swingable about an axis perpendicular to the drawing plane of FIG. 1. As the mirror 8 is driven, tracking operation is carried out for control such that a spot of the laser beam is moved to follow an information track on each optical disc.

The optical path switch 30 serves to change the optical path along which the laser beam is directed alternatively to one of the two optical heads 10a and 10b that correspond individually to the respective recording surfaces of the two facing optical discs. The following is a description of the operation of the switch 30. In the description to follow, the light emitted from the semiconductor laser 1 is supposed to be p-polarized light.

Figures 4A, 4B:
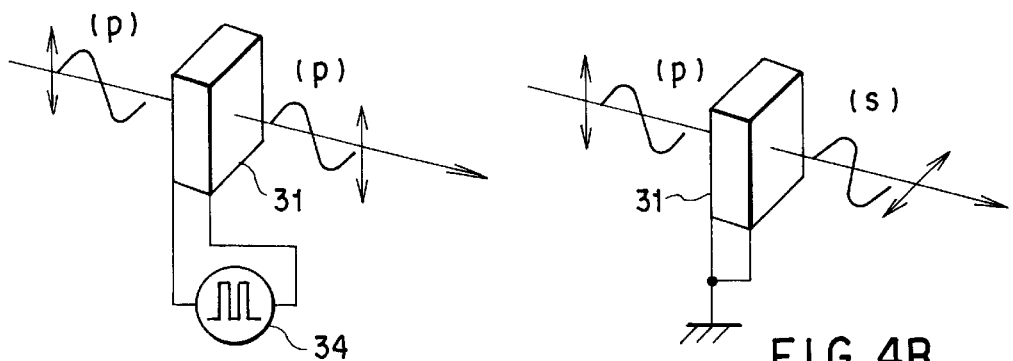
FIGS. 4A and 4B show a difference in the way of polarization of a laser beam transmitted through a liquid crystal cell shown in FIG. 1, depending on whether or not voltage is applied to the cell.

First, in guiding the laser beam to the optical head 10a by the optical path switch 30, voltage is applied to the liquid crystal cell 31 by the liquid crystal cell driver circuit 34, as shown in FIG. 4A. When supplied with the voltage, the cell 31 has no polarization properties, so that it transmits the incident light, p-polarized light, as it is. Preferably, the polarization beam splitter 32 has the reflectance of 0% for p-polarized light and the reflectance of 100% for s-polarized light, for example. The p-polarized light transmitted through the liquid crystal cell 31 is transmitted through the polarization beam splitter 32 as it is, and is directed to the second relay lens 9a.

In guiding the laser beam to the optical head 10b by the optical path switch 30, in contrast with this, no voltage is applied to the liquid crystal cell 31, as shown in FIG. 4B. When supplied with no voltage, the cell 31 has a property to rotate the polarization plane of the incident light through 90°, so that the incident, p-polarized light, is changed into s-polarized light as it is transmitted. As mentioned before, the polarization beam splitter 32 has the reflectance of 100% for s-polarized light. Therefore, the s-polarized light incident upon the splitter 32 is reflected toward the reflection prism 35 and then reflected toward the half-wavelength plate 33 by the prism 35. The s-polarized light is restored to p-polarized light as it is transmitted through the half-wavelength plate 33, and is directed to the second relay lens 9b.

By controlling the voltage applied to the liquid crystal cell 31 in this manner, the optical path switch 30 selects an optical path that is directed to the optical head 10a or an optical path that is directed to the optical head 10b as the optical path for the laser beam.

The laser beam travels along the optical path selected by the optical path switch 30, and is changed back into a parallel beam by its corresponding second relay lens 9a or 9b. The parallel beam is deflected, by its corresponding mirror 11a or 11b, to the recording surface of the optical disc 16a or 16b. The laser beam reflected by the mirror 11a or 11b is concentrated by its corresponding objective or pre-focusing lens 12a or 12b and further by its corresponding SIL 13a or 13b, as a fine spot for recording/reproduction is formed on the recording surface of the corresponding optical disc 16a or 16b.

The optical pickup device includes a relay optical system, which is composed of the first relay lens 7 and the second relay lens 9a or 9b that corresponds to the selected optical path. The relay optical system serves to restrain the laser beam from substantially shifting its position on the mirror 11a or 11b as the galvano-mirror 8 is actuated.

The laser beam reflected by the optical disc, returning along the outward optical path, enters the prism 3 via the optical path switch 30. The entering beam is partially reflected by the interface 3a of the prism 3, and the reflected beam is divided by a interface 3b into two beams, which are directed to the servo photodiode 6 and the information detecting photodiode 5, respectively. The servo photodiode 6 detects a tracking error signal, while the information detecting photodiode 5 detects a regenerative signal corresponding to the recorded information.

In the optical pickup device, the sliders 14a and 14b that support the pre-focusing lenses 12a and 12b and the SILs 13a and 13b are lifted by the air currents that are produced as the discs 16a and 16b rotate. The respective positions of the lenses 12a, 12b, 13a and 13b along the optical axis are controlled by the lift of the sliders. Therefore, control along the optical axis, i.e., focus servo, is unnecessary, and a focus error signal need not be detected. Thus, the servo photodiode 6 is used only for the detection of the tracking error signal for tracking.

The optical pickup device that includes the relay optical system, as mentioned before, requires high-accuracy adjustment. In this optical pickup device, however, the first relay lens 7 is movable along the optical axis. If the optical adjustment for the arrangement that follows the optical path switch 30 is subject to some variation between the optical path that is directed to the optical head 10a and the optical path that is directed to the optical head 10b, therefore, the variation can be absorbed by moving the position of the first relay lens 7 depending on the shift of the switch 30.

Figure 5:
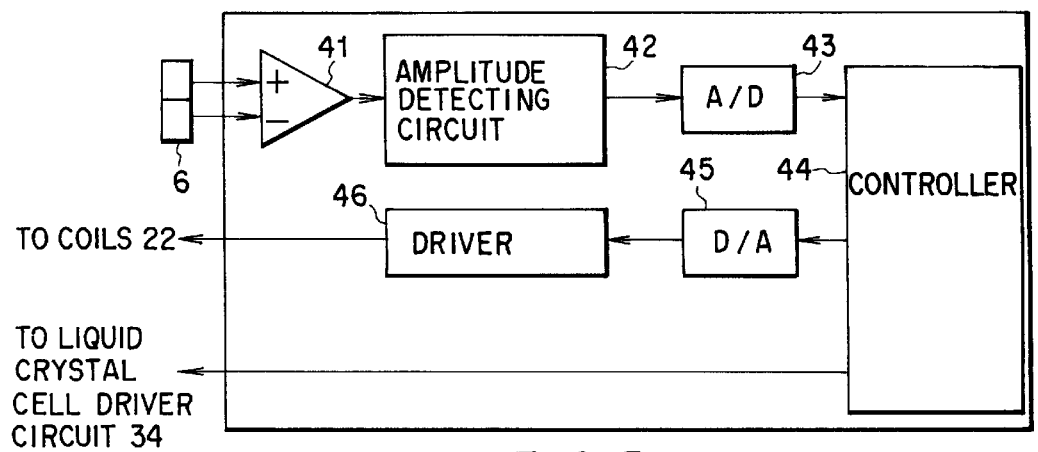
FIG. 5 shows a control circuit for controlling the lens actuator shown in FIG. 1.

As shown in FIG. 5, for example, a control circuit for this correcting operation includes a differential amplifier 41, amplitude detecting circuit 42, A/D converter 43, controller 44 for controlling general operation, D/A converter 45, and driver 46 for current amplification. The differential amplifier 41, in conjunction with the servo photodiode 6, constitutes a tracking error signal detecting unit.

In response to a request for optical path change, the controller 44 causes the liquid crystal cell driver circuit 34 to switch the drive mode of the liquid crystal cell 31, thereby changing the optical path. If there is a difference in the way of optical adjustment between the two optical paths, the laser beam may be defocused or fail to be correctly focused on the disc when the optical path is changed in this manner.

The control circuit controls the lens actuator 20 in response to the optical path change, thereby readjusting the position of the first relay lens 7 to obtain a focused state again.

The position of the first relay lens 7 is adjusted according to the tracking error signal, for example. Normally, the tracking error signal has its maximum amplitude when light is correctly focused on the disc. Thus, the position of the lens 7 is adjusted by maximizing the amplitude of the tracking error signal, for example.

More specifically, after the controller 44 causes the liquid crystal cell driver circuit 34 to change the optical path, the differential amplifier 41 creates a differential signal form the output of each photodiode element of the halved servo photodiode 6. Normally, this differential signal is used as the tracking error signal in information recording/reproducing operation. The amplitude detecting circuit 42 detects the amplitude of the tracking error signal, while the controller 44 fetches the detected value through the A/D converter 43.

The controller 44 causes the D/A converter 45 and the driver 46 to change the current supplied to the coils 22 of the lens actuator 20, thereby moving the first relay lens 7 along the optical axis. As the lens 77 moves in this manner, the amplitude of the tracking error signal or the output of the A/D converter 43 is monitored, the current supplied to the coils 22 is adjusted to a value for a maximum output of the converter 43. In consequence, the first relay lens 7 is located in a position for the maximum amplitude of the tracking error signal, that is, a focused position.

By this correcting operation, the laser beam can be correctly focused on the disc after the optical path is changed. Thereafter, the optical pickup device starts tracking control operation and carries out information recording/reproduction.

According to the above description of the operation, the position of the first relay lens 7 is adjusted so that the amplitude of the tracking error signal is maximized. Alternatively, however, this lens position may be adjusted so that the amplitude of the tracking error signal has a given value to match the properties of the optical pickup device or a disc drive unit as a whole.

Further, the control circuit of FIG. 5 adjusts the position of the first relay lens 7 according to the output of the servo photodiode 6. However, the lens position may be also adjusted according to the output of the information detecting photodiode 5 or the regenerative signal. Since the regenerative signal also has its maximum amplitude in the focused position, the position of the first relay lens 7 can be adjusted by similar control operation. The control may be effected in accordance with an error rate based on digitization of the regenerative signal, binary-coded jitter (fluctuation in the time base direction), etc., not by detecting the amplitude.

Furthermore, the position of the first relay lens 7 need not always be adjusted every time the optical path is changed. Alternatively, the lens position may be adjusted by previously storing, by the controller, an optimum lens position obtained by the aforementioned correcting operation for the optical path change and outputting the value of the optimum position thereafter, for example.

As described above, the optical pickup device according to the present embodiment includes the lens actuator 20 for driving one lens of a relay lens system, that is, the first relay lens 7, along the optical axis. Thus, the device is designed to compensate variation in the length of the optical path between the first relay lens 7 and one of the second relay lenses 9a and 9b that is caused when the optical path is changed by the optical path switch 30. Further, the initial misalignment of the optical path length between the first relay lens 7 and one of the second relay lenses 9a and 9b, that is, deviation from a desired design value, can be corrected. In consequence, the optical pickup device can cope with the tendency toward high-speed operation and mass storage without entailing a substantial increase in assembling cost.

An optical pickup device according to another embodiment of the present invention will now be described with reference to the accompanying drawings. The optical pickup device according to the present embodiment is a device for recording/reproducing information on/from an optical medium having a recording surface. That is, it is an optical pickup device for recording/reproducing information with no changing of optical path.

Figure 6:
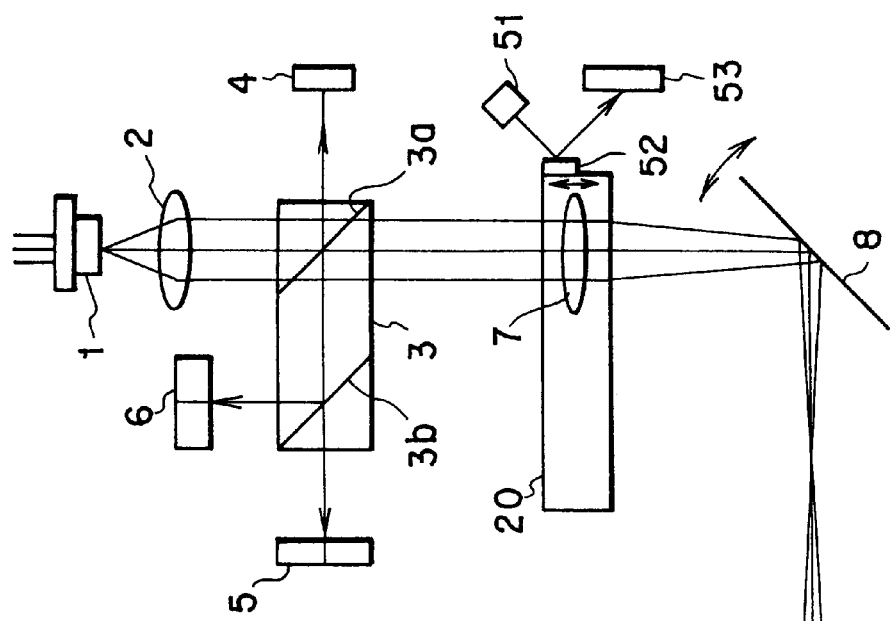
FIG. 6 is a plan view of an optical pickup device according to another embodiment of the present invention.

As shown in FIG. 6, the optical pickup device comprises a semiconductor laser 1 as a light source for emitting a beam of light for information recording/reproduction, a collimating lens 2 for changing the laser beam from the laser 1 into a parallel beam, a galvano-mirror 8 for deflecting the laser beam to effect tracking control, and an optical head 10.

Figure 7:
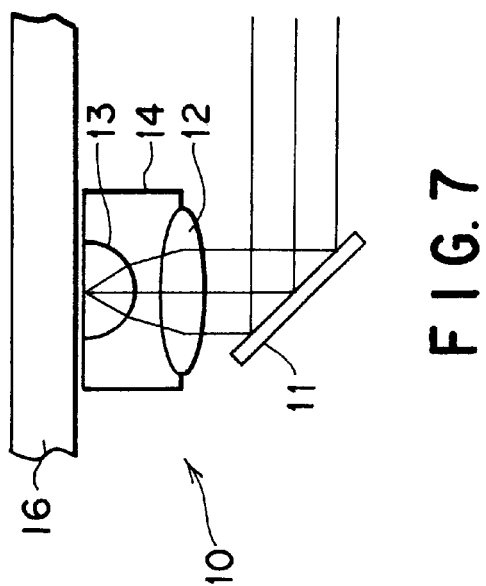
FIG. 7 is a side view of an optical head shown in FIG. 6.

As shown in FIG. 7, the optical head 10 includes mirror 11 for bending the laser beam toward an optical disc 16 and an objective lens (pre-focusing lens) 12 for concentrating the laser beam on the disc 16. For near field recording/reproduction, the optical head 10 may further include a solid immersion lens (SIL) 13 for further concentrating the laser beam and a slider 14 for supporting the lenses 12 and 13. The slider 14 is lifted off the optical disc 16 by air current caused by rotation of the disc 16.

The optical pickup device further comprises a first relay lens 7 for changing the parallel laser beam from the collimating lens 2 into a convergent beam and a second relay lens 9 located between the galvano-mirror 8 and the optical head 10. The lens 9 changes a divergent beam back into a parallel beam after the convergent beam from the first lens 7 is converged once. Moreover, the optical pickup device includes a lens actuator 20 as a lens drive unit for driving the first relay lens 7 along its optical axis, so as to adjust the length of optical path between the first relay lens 7 and the second relay lens 9.

The optical pickup device further comprises a lens position sensor for directly detecting the position of the first relay lens 7. As is schematically shown in FIG. 6, for example, the lens position sensor includes a mirror 52 attached to the lens actuator 20, a light emitting diode 51 for emitting light falling on the mirror 52, and a position sensing optical device (PSD) 53 for receiving reflected light from the mirror 52. Actually, the mirror 52 is fixed to a holding member 21 that moves together with the first relay lens 7.

For signal detection, furthermore, the optical pickup device includes a prism 3, located between the collimating lens 2 and the first relay lens 7, for partially reflecting the laser beam from the collimating lens 2 and separating going and returning laser beams, a monitoring photodiode 4 for detecting the intensity of the laser beam emitted from the semiconductor laser 1, an information detecting photodiode 5 for detecting information signals, and servo photodiode 6 for detecting servo signals.

A divergent beam of light emitted from the semiconductor laser 1 is changed into a parallel beam by the collimating lens 2, and the parallel beam reaches the prism 3. The light beam incident upon a surface 3a of the prism 3 is partially reflected and directed to the monitoring photodiode 4. The photodiode 4 is used as a monitor for controlling the output power of the semiconductor laser 1.

After the laser beam passing through the prism 3 is changed into a convergent beam by the first relay lens 7, and then directed to the second relay lens 9 by the galvano-mirror 8. The laser beam is changed back into a parallel beam by the second relay lens 9, and then deflected by the mirror 11 to the recording surface of the optical disc 16. The laser beam reflected by the mirror 11 is concentrated by the objective or pre-focusing lens 12 and further by the SIL 13, as a fine spot for recording/reproduction is formed on the recording surface of the optical disc 16.

The laser beam reflected by the optical disc, returning along the outward optical path, enters the prism 3. The incident beam is partially reflected by the interface 3a of the prism 3, and the reflected beam is divided by a interface 3b into two beams, which are directed to the servo photodiode 6 and the information detecting photodiode 5, respectively. The servo photodiode 6 detects a tracking error signal, while the information detecting photodiode 5 detects a regenerative signal corresponding to the recorded information.

The optical pickup device controls the position of the first relay lens 7 along the optical axis on the basis of the information obtained by the lens position sensor at all times, for stabilizing its operation during and just after the seek operation, and for increasing stabilization of its operation against external vibration, as well.

The light emitted from the light emitting diode 51 is reflected by the mirror 52, which is attached to the lens actuator 20, and is directed to the PSD 53. When the first relay lens 7 is actuated by the lens actuator 20, the mirror 52 moves, whereupon the spot position moves on the PSD 53. The PSD 53 includes two light receiving sections. The difference between the respective outputs of the two light receiving sections is reflective of the spot position. Thus, the spot position or the position of the lens actuator 20 can be detected by obtaining the difference between the outputs of the two light receiving sections. As the current supplied to the coils 22 is controlled so that the difference is constant, the first relay lens 7 is kept in a proper position such that the laser beam is correctly focused on the optical discs 16a and 16b. The details of the detection of the lens position are described in Jpn. Pat. Appln. KOKAI Publication No. 6-76325 that is incorporated herein by reference, for example. A detailed description of this detection is omitted.

If the entire optical pickup device is driven sharply for seek operation, for example, a force of inertia acts to move the first relay lens 7. Since the output of the lens 7 is fed back to the lens actuator 20, however, the lens 7 can be kept in the proper position without regard to the force of inertia. Thus, the operation of the optical pickup device during and immediately after the seek operation is stabilized, and its stability against external vibration is improved.

As described above, the optical pickup device that includes a relay lens system requires high accuracy against optical adjusting. The optical pickup device according to the present embodiment, however, includes the lens actuator 20 for driving one lens of a relay lens system, that is, the first relay lens 7, along the optical axis, therefore, the initial misalignment of the optical path length between the first relay lens 7 and the second relay lenses 9, that is, deviation from a desired design value, can be easily corrected.

The position of the first relay lens 7 is adjusted according to the tracking error signal, for example. The position of the first relay lens 7 may be also adjusted according to the regenerative signal. Since both of the tracking error and regenerative signals have its maximum amplitude as light is correctly focused on the disc, the position of the lens 7 is adjusted by maximizing the amplitude of the tracking error signal. The details are already described in above-mentioned embodiment.

Although illustrative embodiments of the present invention have been described herein, it is to be understood that the present invention is not limited to the embodiments, and that various changes and modifications may be effected therein.

According to the embodiments described above, for example, the optical head, which includes the objective lens and the SIL, can perform near field recording/reproduction. Alternatively, however, it may include only a single conventional objective lens that is spaced from the recording surface of the optical disc. In general, an optical head of this type requires focus control, which can be effected by the lens actuator.

Further, the lens actuator is not limited to an electromagnetic type, and may be of any other type that is driven by a conventional device such as a piezoelectric device. Furthermore, the lens actuator may be designed so as to actuate the second relay lenses that are situated nearer to the optical heads or to actuate the collimating lens, instead of actuating the first relay lens that is situated nearer to the light source.

Although, in the optical pickup device according to the primary embodiment, the two optical paths are changed over to each other, the number of optical paths is not limited to two. More specifically, the optical pickup device may be designed so that three or more optical paths are changed over to one another. Thus, the optical pickup device may comprise an optical path switching device for changing over the three or more optical paths to one another, second relay lenses as many as the optical paths, and optical heads as may as the optical paths.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pickup device for recording/reproducing information on/from at least one optical medium having a plurality of recording surfaces or a plurality of optical media each having at least one recording surface, comprising:
   a light source for emitting a beam of light for information recording/reproduction;
   a plurality of optical heads for focusing the beam on a plurality of different recording surfaces;
   an optical path switching device, positioned between the light source and the optical heads, for changing an optical path for guiding the beam alternatively to one of the optical heads;
   a first relay lens, positioned between the light source and the optical path switching device, for changing the beam into a convergent beam;
   second relay lenses, positioned individually between the optical path switching device and the optical heads, for changing a divergent beam, obtained after the convergent beam from the first relay lens is temporarily converged, back into a parallel beam; and
   a lens drive unit for driving the first relay lens along the optical axis thereof so as to adjust the respective lengths of optical paths between the first relay lens and the second relay lenses.

2. An optical pickup device according to claim 1, further comprising a galvano-mirror, positioned between the first relay lens and the optical path switching device, for serving for tracking control.

3. An optical pickup device according to claim 1, further comprising a tracking error signal detecting unit for detecting a tracking error signal, and wherein the lens drive unit drives the first relay lens along the optical axis in accordance with the tracking error signal.

4. An optical pickup device according to claim 1, further comprising a regenerative signal detecting unit for detecting a regenerative signal corresponding to the information recorded on the recording surface, and wherein the lens drive unit drives the first relay lens along the optical axis in accordance with the regenerative signal.

5. An optical pickup device according to claim 1, wherein the lens drive unit drives the first relay lens along the optical axis in synchronism with the change of the optical path by the optical path switching device.

6. An optical pickup device according to claim 1, wherein each of the optical heads includes an objective lens for concentrating the beam.

7. An optical pickup device according to claim 6, wherein each of the optical heads further includes a solid immersion lens for further concentrating the beam concentrated by the objective lens and a slider supporting the objective lens and the solid immersion lens, the slider being lifted off the optical medium by an air current produced as the optical medium rotates.

8. An optical pickup device for recording/reproducing information on/from an optical medium which has at least one recording surface, comprising:
   a light source for emitting a beam of light for information recording/reproduction;
   an optical heads for focusing the beam on a recording surface;
   a first relay lens, positioned between the light source and the optical head, for changing the beam into a convergent beam;
   second relay lenses, positioned between the first relay lens and the optical head, for changing a divergent beam, obtained after the convergent beam from the first relay lens is temporarily converged, back into a parallel beam;
   a lens drive unit for driving the first relay lens along the optical axis thereof so as to adjust the lengths of optical paths between the first relay lens and the second relay lens; and
   a lens position sensor for directly detecting the position of the first relay lens.

9. An optical pickup device according to claim 8, further comprising a galvano-mirror, positioned between the first relay lens and the optical path switching device, for serving for tracking control.

10. An optical pickup device according to claim 8, further comprising a tracking error signal detecting unit for detecting a tracking error signal, and wherein the lens drive unit drives the first relay lens along the optical axis in accordance with the tracking error signal and information obtained by the lens position sensor.

11. An optical pickup device according to claim 8, further comprising a regenerative signal detecting unit for detecting a regenerative signal corresponding to the information recorded on the recording surface, and wherein the lens drive unit drives the first relay lens along the optical axis in accordance with the regenerative signal and information obtained by the lens position sensor.

12. An optical pickup device according to claim 8, wherein the optical head includes an objective lens for concentrating the beam.

13. An optical pickup device according to claim 12, wherein the optical head further includes a solid immersion lens for further concentrating the beam concentrated by the objective lens and a slider for supporting the objective lens and the solid immersion lens, the slider being lifted off the medium by an air current produced as the medium rotates.

14. An optical pickup device according to claim 8, wherein the lens position sensor includes a mirror movable together with the first relay lens, a light emitting device for emitting light falling on the mirror, and a position sensing device for detecting the position of the mirror in accordance with reflected light from the mirror.

15. An optical pickup device according to claim 1, wherein the lens drive unit includes plate-like supporting members for supporting the first relay lens so as to allow it to move along the optical axis thereof, the supporting members being located so that its long sides extend parallel to the recording surface of the optical medium.

16. An optical pickup device according to claim 8, wherein the lens drive unit includes plate-like supporting members for supporting the first relay lens so as to allow it to move along the optical axis thereof, the supporting members being located so that its long sides extend parallel to the recording surface of the optical medium.

* * * * *